United States Patent [19]

Muramatsu

[11] Patent Number: 5,339,127
[45] Date of Patent: Aug. 16, 1994

[54] LENS-FITTED PHOTOGRAPHIC FILM PACKAGE

[75] Inventor: Katsuji Muramatsu, Tokyo, Japan

[73] Assignee: Fuji Photo Film Co., Ltd., Kanagawa, Japan

[21] Appl. No.: 112,522

[22] Filed: Aug. 27, 1993

[30] Foreign Application Priority Data

Aug. 27, 1992 [JP] Japan .................. 4-228963

[51] Int. Cl.⁵ ............................................. G03B 17/02
[52] U.S. Cl. ........................................................ 354/288
[58] Field of Search ........................................... 354/288

[56] References Cited

U.S. PATENT DOCUMENTS 5,126,775 6/1992 Nakai et al. ............... 354/288

FOREIGN PATENT DOCUMENTS 4222356 1/1993 Fed. Rep. of Germany .

Primary Examiner—Michael L. Gellner
Assistant Examiner—Nicholas J. Tuccillo
Attorney, Agent, or Firm—Young & Thompson

[57] ABSTRACT

A lens-fitted photographic film package, some of whose parts are designed to be directly reused. A projection is formed integrally with a molded resin part of the package body which is to be reused. The projection is brought into contact with another part of the film package and elastically deformed by that part when assembled into the package body. If the molded resin part is in normal condition suitable for reuse, the projection elastically recovers its initial shape when the parts are disassembled. Whether the predetermined parts of the package body can be directly reused or not is determined by detecting heat distortion of the projection. A referential projection, which is never distorted and so maintains its initial shape, is formed beside the elastically deformed projection.

12 Claims, 2 Drawing Sheets

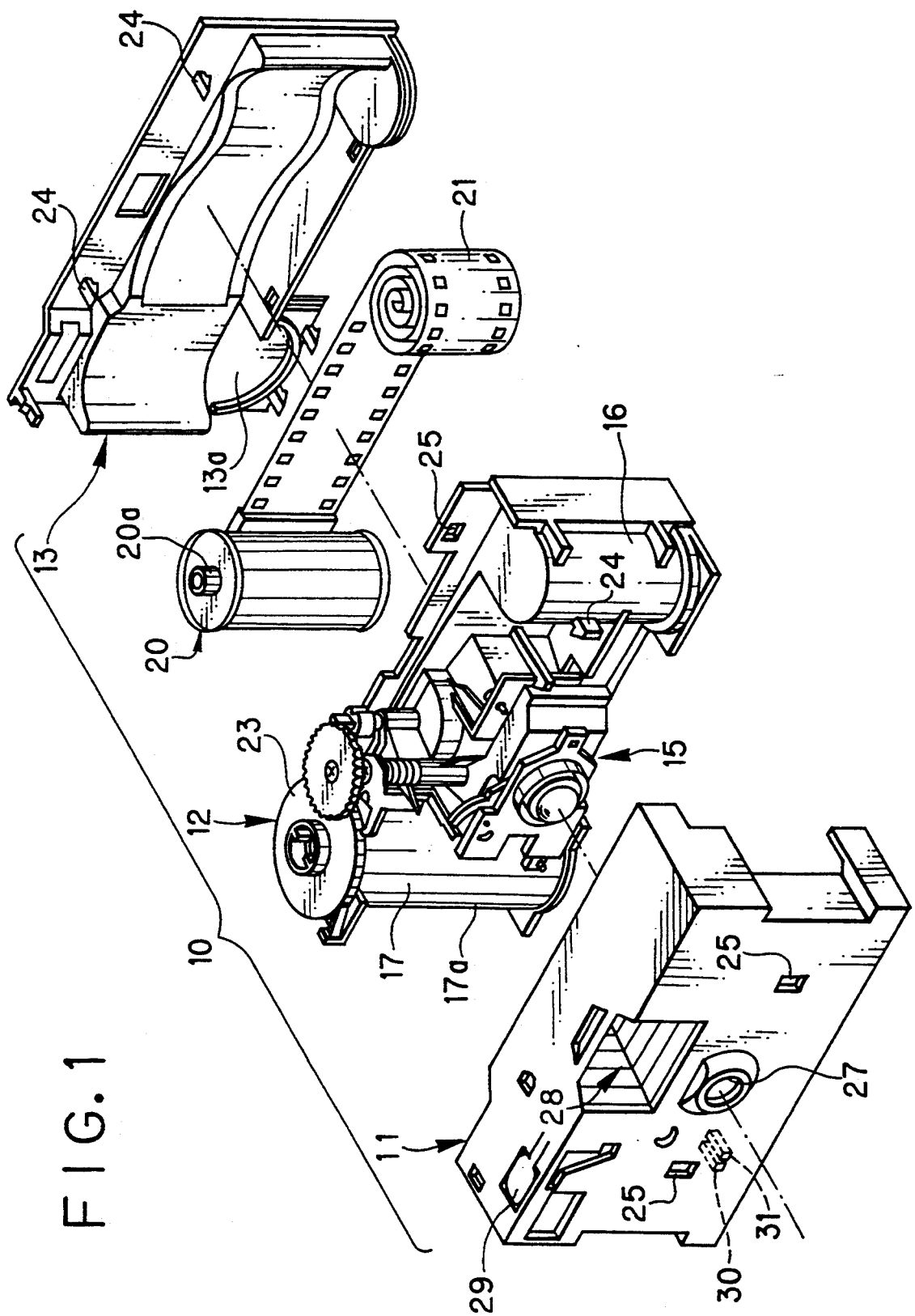

LENS-FITTED PHOTOGRAPHIC FILM PACKAGE

BACKGROUND OF THE INVENTION

1. Field of the Invention

The present invention relates to a lens-fitted photographic film package, and more particularly to a lens-fitted photographic film package in which the inspection process to determine reusability of the parts is simplified and thus the efficiency of inspection is improved.

2. Related Art

Lens-fitted photographic film packages (hereinafter called simply film packages) are now on the market, for example under the trademark "Quick Snap". Each such film package is a single-use camera designed to make it possible to take pictures whenever desired without buying or carrying about an expensive and heavy camera. The film package is pre-loaded with photographic film in the factory, so that the user can take photographs without the need for film loading. After the exposure of all available frames of the pre-loaded film, the user is not required to rewind and unload the film. The user has only to forward the whole film package to a photofinisher or an agency for development of the exposed film.

The exposed film is removed from the film package for development and printing in a photofinishing laboratory, and the developed film and the consequent photographic prints are returned to the user. Emptied bodies of the film packages are reused or recycled.

Because of these properties and the manner of use of the film packages, it is necessary to minimize production costs of the film package. For this reason, most essential parts of the package body are formed from resin materials. When assembly, most parts are attached to each other by snap-in engagement between a hook and a hole, making use of the elasticity of the resin material.

Not only for reducing production costs, but also for saving natural resources, it is desirable to reuse the parts of the package body. In order to reuse the parts, the emptied film packages are recovered and disassembled into their individual parts. The parts are sorted out between those directly reusable and those whose material is recyclable. The directly reusable parts are returned to the assembling process of the film package. The parts to be recycled are sorted according to the kind of material, and suitably processed, for example, crushed, melted and/or formed into pellets.

It is desirable to reuse the parts of the package body or to recycle the materials thereof not only to save natural resources but also for environmental protection. But before any parts can be reused, it is necessary to inspect them for reliability and reusability. Most parts of the package body are made from PS (polystyrene) resin because of the superior moldability and low cost thereof. However, it is known in the art that PS resin is permanently deformed or heat distorted at a temperature of about 85° C. For example, the interior temperature of a car can reach this under a burning sun. Therefore, if the film package is left in such a car, those parts of the film package which are made from PS resin and elastically deformed in the assembled state will be permanently distorted, and the elasticity thereof will be decreased. The heat distortion may occur even at a temperature about 65° C. if the film package is left for a sufficiently long time in such a hot place.

If the heat-distorted parts were directly reused, because those parts lose necessary elasticity, troubles would arise. For example, the snap-in engagement would be loose, the required optical quality would not be achieved, or the light imperviousness of certain portions would be insufficient. For this reason, for the parts to be directly reused, it has been necessary to measure and inspect these parts in various ways, in order to judge their suitability for reuse. For example, the dimensions of each part are measured with a precision of about 0.1 mm, or the elasticity of the part is tested. Such measurement or inspection processes require much time and labor.

OBJECT OF THE INVENTION

In view of the foregoing, a primary object of the present invention is to provide a film package for which the inspection process is simplified so as to improve the efficiency inspection prior to reuse of the parts thereof.

SUMMARY OF THE INVENTION

To achieve the above and other objects, the present invention provides a projection formed integrally with a resin-molded part of the package body such that the projection is brought into contact with another part of the film package and elastically deformed by that part when assembled into the package body. The projection is designed to elastically recover its initial shape when the parts are disassembled, if the resin-molded part is in normal condition. Therefore, it is possible to determine whether the parts of the package body can be directly reused, by checking whether and to what degree the projection has been heat distorted.

It is preferable to provide a referential projection beside the projection that is deformed, such that the reference projection maintains the initial shape thereof in assembled state. Comparison of the two projections will thus readily determine the condition of the deformed projection.

BRIEF DESCRIPTION OF THE DRAWINGS

Other objects and advantages of the present invention will become apparent from the following detailed description of the preferred embodiments when read in connection with the accompanying drawings, wherein like reference numerals designate like or corresponding parts throughout the several views, and wherein:

FIG. 1 is an exploded perspective view of a film package according to an embodiment of the invention;

DETAILED DESCRIPTION OF THE PREFERRED EMBODIMENTS

Figure 2A:
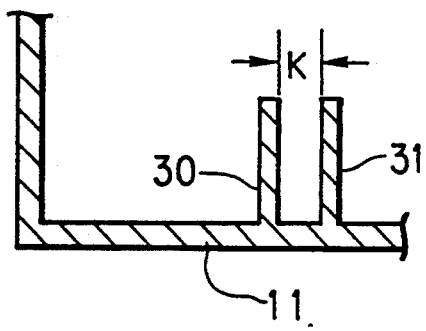
FIGS. 2A, 2B and 2C are sectional views of essential parts of the embodiment shown in FIG. 1, illustrating the operation of the invention.

A film package has a package body 10 comprised of a front cover 11, a main body 12, and a rear cover 13 which are made of resin materials, e.g., PS resin. On the front of the main body 12, an exposure unit 15 is removably mounted. The exposure unit 15 includes a taking lens made of plastic, e.g., an acrylic glass, a shutter mechanism such as a shutter blade and a spring, a film advancing mechanism, and other elements necessary for exposure. The main body 12 has a film roll chamber 16 and a cassette chamber 17 disposed on opposite horizontal sides of exposure unit 15. The cassette chamber 17 receives a photographic film cassette 20 therein, and the film roll chamber 16 receives a roll of unexposed photographic film 21 which is pulled out from the cassette 20 and wound in a roll before assembling the film package. A film winding wheel 23 is mounted on the top of the cassette chamber 17 and is coupled to a spool 20a of the cassette 20, so that the photographic film 21 is wound back into the cassette 20 one frame after each exposure by rotating the film winding wheel 23.

The front cover 11 and rear cover 13 are attached to the front and the rear of the main body 12, respectively, through snapin engagement between hooks and holes 24 and 25 correspondingly formed in these parts. The rear cover 13 has a bottom lid 13a integrally formed therewith so as to permit opening the cassette chamber 17 at the bottom thereof when removing the cassette 20 containing the exposed photographic film 21. The front cover 11 is formed from PS resin and has an exposure opening 27 positioned in front of the taking lens, a viewfinder window 28, a shutter button 29 and several openings necessary for the operation of the exposure unit 15. The package body 10 is enclosed in a cardboard box or other outer packaging member (not shown) to finish the film package for sale, and the film package is used with this outer packaging member in place. Among these basic parts, the front cover 11, the main body 12, and the exposure unit 15 are adapted to be directly reused.

Figure 2B:
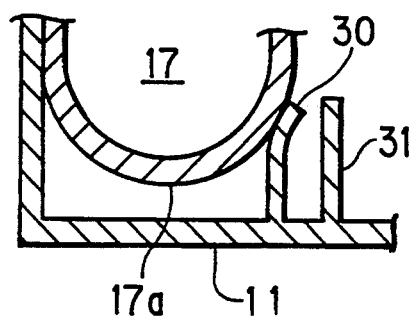
Figure 2C:
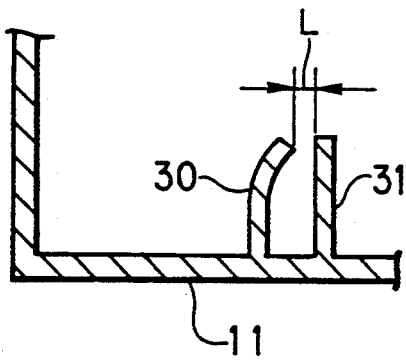

As is shown in detail in FIGS. 2A, 2B and 2C, the front cover 11 further has a pair of projections 30 and 31 formed integrally on the inside wall thereof. The projections 30 and 31 protrude inwardly from the front cover 11 parallel to each other. The free ends of the projections 30 and 31 are spaced a distance K apart from each other. When the front cover 11 is attached to the main body 12, the projections 30 and 31 are disposed between the exposure unit 15 and the cassette chamber 17, such that an outer wall 17a of the cassette chamber 17 elastically deforms the first projection 30 to bend it toward the second projection 31, as is shown in FIG. 2B. On the other hand, the second projection 31 is in contact with neither the cassette chamber 17 nor the exposure unit 15, so that the second projection 31 will not be deformed and thus functions as a reference with which projection 30 may be compared.

The operation of the above-described embodiment is as follows:

After the exposure of all available frames of the previously loaded photographic film 21, the cassette chamber 17 containing the exposed photographic film 21 is removed from the package body 10, and the emptied package body 10 is recovered and disassembled by the manufacturer. Thereafter, the front cover 11 is subjected to inspection wherein the first and second projections 30 and 31 are compared.

Namely, if the recovered film package has ever been left in a very hot environment of more than 85° C., the first projection 30 of the front cover 11, which is formed from PS resin, will be permanently deformed or heat distorted, whereas the second projection 31, which is never subjected to distortion, is maintained unchanged in shape. In that case, the first projection 30 does not elastically recover the initial shape as shown in FIG. 2A even after the front cover 11 is detached from the main body 13 to remove the first projection 30 from contact with the outer wall 17a of the cassette chamber 17. As a result, the spacing between the free ends of the projections 30 and 31 decreases from the initial value K to a value L, as shown in FIG. 2C. If, on the contrary, the recovered film package has not been left in such a very hot environment, the first projection 30 elastically recovers its initial shape when separated from cassette chamber 17.

Therefore, it is possible to detect whether the film package has ever been left in a critically hot environment by checking the spacing L between the projections 30 and 31. If it is determined that the first projection 30 is distorted, the corresponding front cover 11 and the main body 12 of the same film package are not directly reused but are processed for recycling of the materials. If the first projection 30 is not distorted, the corresponding front cover 11 and the main body 12 are reused. The spacing L is detected, for example, by unsuccessfully trying to insert an inspection plate having a width equal to the value K of the initial spacing, or automatically by means of a photo-sensor system.

To inspect for reusability of the exposure unit 15, the performance of the shutter mechanism is tested independently of the heat distortion of the projection 30. Also the taking lens is inspected, for example, to determine whether there is any scratch on the lens surface.

Although the projections 30 and 31 are arranged side by side in a horizontal direction of the film package, that is, the direction orthogonal to the axial direction of the cassette chamber, it is also possible to arrange first and second referential projections vertically on the inner wall of the front cover 11, that is, in alignment with each other the axial direction of the cassette chamber.

Figure 3A:
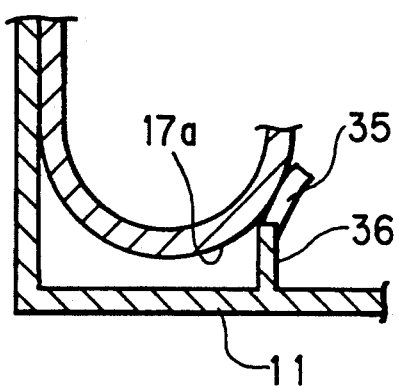
FIGS. 3A and 3B are sectional views of essential parts of another embodiment of the invention.
Figure 3B:
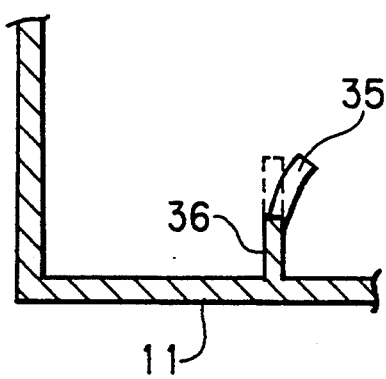

FIGS. 3A and 3B illustrate such an axially aligned embodiment wherein a pair of projections 35 and 36 formed on a front cover 11 are vertically aligned and extend inwardly from the front cover 11. The first projection 35 has such a length that the free end portion of the first projection 35 is brought into contact with an outer wall 17a of a cassette chamber when the front cover 11 is attached to a main body having the cassette chamber. The second projection 36 is a referential projection and has a length less than the length of the first projection such that the free end of the second projection 36 will not be in contact with the outer wall 17a of the cassette chamber.

If a film package having the projections 35 and 36 is left in a critically hot environment, the first projection 35 is heat distorted as shown by solid line in FIG. 3B, so that the first projection 35 cannot recover the initial shape as shown by dashed line in FIG. 3B. Therefore, the distortion of the first projection 35 is determined with reference to the second projection 36, for example, by means of a photo-sensor system, in order to inspect to determine the suitability for direct reuse of these basic parts.

Although the present invention has been described with reference to the embodiments shown in the drawings, it is possible to omit the second projection 31 or 36 and to inspect for heat distortion by using the first projection 30 or 35 alone. It is also possible to provide a plurality of projections elastically deformed by other parts in the assembled state of the film package, such that the projections are different from one another in position, length, thickness and so forth. In this way, the projections are under various stresses when elastically deformed. Since the projections can recover the initial shape the easier, the less the stress of the deformed projections is, it is possible to determine the degree of the adverse conditions to which the film package was subjected, depending on the degree of distortion of these projections.

Thus, the invention is not to be limited to the above-described embodiments, but on the contrary, various modifications may be possible within the scope of the appended claims.

What is claimed is:

1. A lens-fitted photographic film package which has a package body containing a roll of photographic film and having an exposure mechanism for exposing said photographic film, said package body having at least a first part and a second part which are molded from resin, said lens-fitted photographic film package comprising:

at least one projection formed integrally with said first part, said projection being brought into contact with said second part and elastically deformed by said second part when said parts are removably assembled into said package body, said projection being adapted to indicate that at least said first part is suitable for reuse if said projection elastically recovers an initial shape when said parts are disassembled, and that at least said first part is not suitable for reuse if said projection is permanently deformed.

2. A lens-fitted photographic film package as recited in claim 1, wherein said second part is made of the same resin as said first part, and thus is indicated to be suitable for reuse when said first part is indicated to be suitable for reuse.

3. A lens-fitted photographic film package as recited in claim 2, wherein said resin is polystyrene resin.

4. A lens-fitted photographic film package as recited in claim 1, wherein said first and second parts have hooks and holes for snap-together engagement for removably assembling said parts into said package body.

5. A lens-fitted photographic film package as recited in claim 1, wherein said second part includes a main body section having a film roll chamber holding said roll of photographic film and a cassette chamber holding a cassette for containing said photographic film after exposure, and said first part includes a front cover section attached to said main body section, and said projection is formed on an inner wall portion of said front cover section and is elastically deformed by an outer wall portion of said main body section.

6. A lens-fitted photographic film package as recited in claim 5, wherein said projection is elastically deformed by an arched outer wall of said cassette chamber.

7. A lens-fitted photographic film package as recited in claim 1, further comprising a referential projection formed beside said first projection integrally with said first part, in such a position that said referential projection maintains an initial shape thereof in the assembled state of said first and second parts.

8. A lens-fitted photographic film package as recited in claim 7, wherein said first projection and said referential projection are arranged side by side in a direction in which said first projection is elastically deformed, whereby permanent distortion of said first projection is indicated by a change in spacing between said first projection and said referential projection.

9. A lens-fitted photographic film package as recited in claim 8, wherein said first and referential projections have the same dimension, and a change in spacing between free ends of said projections indicates permanent distortion.

10. A lens-fitted photographic film package as recited in claim 7, wherein said first projection and said referential projection are arranged in a direction orthogonal to a direction in which said first projection is elastically deformed.

11. A lens-fitted photographic film package as recited in claim 10, wherein said referential projection has a length less than that of said first projection.

12. A lens-fitted photographic film package as recited in claim 1, wherein there are plurality of said projections which are elastically deformed under different conditions from one another.

* * * * *